April 22, 1958          T. ONGARO          2,831,353

FORCE PRODUCING APPARATUS

Filed Sept. 6, 1955          3 Sheets-Sheet 1

INVENTOR.
Theodore Ongaro
BY J. Stanley Churchill
ATTORNEY

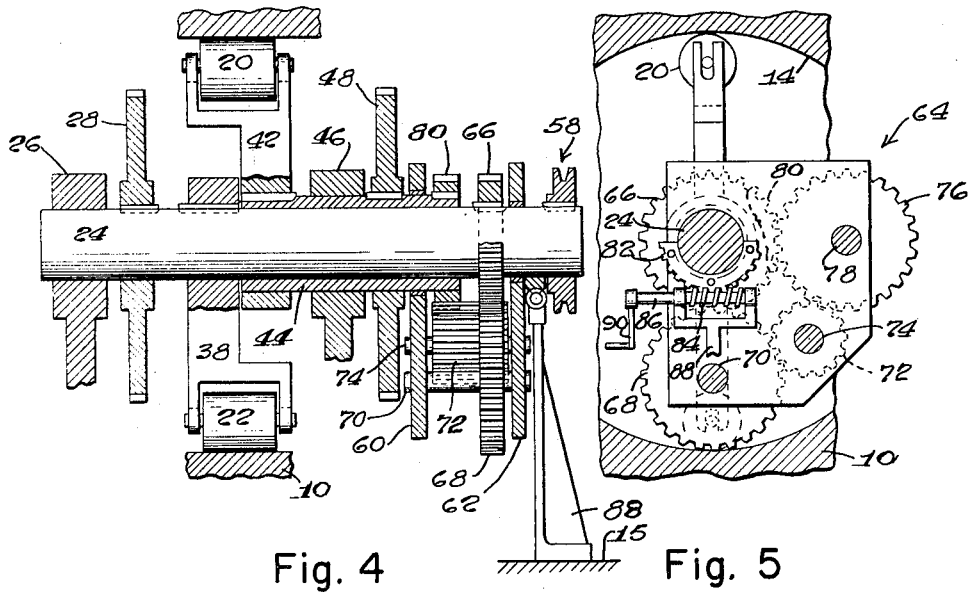

April 22, 1958   T. ONGARO   2,831,353
FORCE PRODUCING APPARATUS
Filed Sept. 6, 1955   3 Sheets-Sheet 3

INVENTOR.
Theodore Ongaro
BY
J. Stanley Churchill
ATTORNEY

United States Patent Office 2,831,353
Patented Apr. 22, 1958

2,831,353

FORCE PRODUCING APPARATUS

Theodore Ongaro, Columbus, Ohio, assignor to International Research and Development Corporation, Columbus, Ohio, a corporation of Ohio Application September 6, 1955, Serial No. 532,426

4 Claims. (Cl. 74—61)

This invention relates to force producing apparatus and more particularly to a vibratory force producing apparatus.

The invention has for an object to provide novel and improved force producing apparatus of the character specified capable of producing harmonic vibratory forces in a single plane and of relatively large magnitude in which novel provision is made for adjusting the apparatus from a zero position wherein no motion is effected to a maximum position of vibration in a simple and practical manner.

With this general object in view and such others as may hereinafter appear, the invention consists in the force producing apparatus hereinafter described and particularly defined in the claims at the end of this specification.

In the drawings illustrating the preferred embodiment of the invention:

Fig. 4 is a cross sectional detail view showing the driving and adjusting mechanism as seen from the line 4—4 of Fig. 2 with portions broken away for clearness of illustration;

Fig. 5 is an end view of the apparatus shown in Fig. 4, some of the parts being broken away and shown in cross section;

Fig. 6 is a perspective view of the mechanism shown in Fig. 4; and

In general the present invention contemplates novel force producing apparatus and particularly a vibratory force generator adapted to be attached to a body to be vibrated, such as a screen or similar apparatus mounted to be freely vibrated. In the preferred embodiment of the invention the vibratory force generator includes a housing provided with spaced parallel bores in which rotating cylinders are mounted for rolling engagement with the inner walls of the bores, the centrifugal force generated stresses being communicated to the walls of the housing to effect vibration of the body to which it is attached. The rotating cylinders are mounted so that the developed cyclic forces are not transmitted to the shafts, gears and bearings of the apparatus so that a relatively simple bearing structure may be employed.

In accordance with a feature of the invention the present apparatus is capable of generating harmonic vibratory forces in one place and of relatively large magnitude irrespective of the fraquency or mass associated therewith and in which provision is made for adjusting the apparatus from a zero position wherein no motion is effected to a maximum position of vibration while the apparatus is in operation, and by such adjustment relatively large forces may be generated in a safe manner at a magnitude just short of the elastic limit of the structure.

Figure 1:
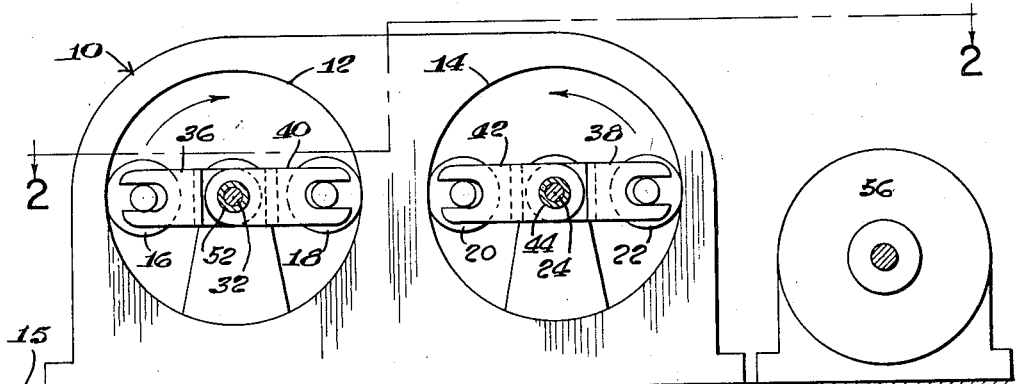
Fig. 1 is a side elevation partly in cross section of the present force producing apparatus as viewed from the line 1—1 of Fig. 2.
Figure 2:
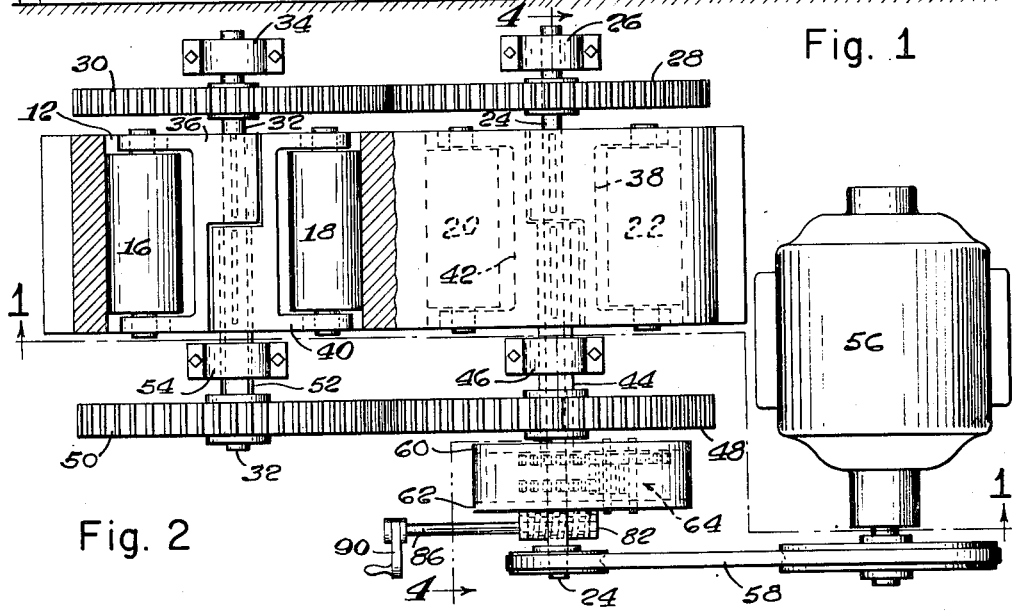
Fig. 2 is a plan view of the same partly in cross section as viewed from the line 2—2 of Fig. 1.

Referring now to the drawings, 10 represents a housing having two spaced and parallel bores 12, 14 of equal diameter extended therethrough, the housing and its driving mechanism being attached to the frame 15 of the body to be vibrated. A pair of force generating cylindrical rollers 16, 18 are mounted for rolling engagement with the wall of the bore 12, and a second pair of cylindrical rollers 20, 22 are similarly mounted for rolling engagement with the wall of the bore 14, all of the rollers preferably being of equal weight and diameter. Provision is made for supporting the rollers 16, 18 for rotation in one direction in the bore 12, as indicated by the arrow in Fig. 1, and for supporting the rollers 20, 22 for rotation in the opposite direction in the bore 14, as indicated by the arrow, all of the rollers being rotated at equal speeds. As shown in Figs. 1 and 2, a central shaft 24 extended through the bore 14 and supported at one end in a bearing support 26 is provided with a gear 28 keyed thereto which meshes with a similar gear 30 keyed to a central shaft 32 extended through the bore 12 and supported at one end in a bearing support 34 whereby to effect rotation of the shafts 24, 32 at equal speeds and in opposite directions. The roller 16 is guided for rolling engagement with the wall of the bore 12 in the slotted end of an arm 36 keyed to the central shaft 32, and the roller 22 is similarly guided for rolling engagement with the wall of the bore 14 in the slotted end of an arm 38 keyed to the central shaft 24, the arms 36, 38 being arranged on their respective shafts so that they will assume parallel positions when they arrive at upper or lower vertical positions with relation to their shafts 32, 24.

The rollers 18, 20 are similarly guided in the slotted ends of arms 40, 42 for rolling engagement with their respective bores 12, 14, the arm 42 being keyed to a sleeve 44 supported on the central shaft 24 and extended through a bearing support 46 having a gear 48 keyed thereto, the gear 48 being of the same diameter as the gear 28 on the central shaft 24. The gear 48 meshes with a gear 50 keyed to a similar sleeve 52 supported on the central shaft 32 and extended through a bearing support 54, the arm 40 being keyed to the sleeve 52, as shown, so that in operation the arms 40, 42 keyed to the sleeves 52, 44 will be rotated at the same speed and in opposite directions and will also assume parallel positions when they arrive at a vertical plane above or below the center of their respective sleeves.

As shown in Figs. 2, 4 and 5, the illustrated driving mechanism for rotating the roller units in each bore includes a motor 56 connected by a belt and pulley drive 58 to the extended end of the central or main driving shaft 24, the shaft extending through end plates 60, 62 which support a train of gears therebetween, as indicated generally at 64. Rotation of the central shaft 24 effects rotation of the arms 36, 38 and their respective rollers 16, 22. The train of gears 64 includes a gear 66 keyed to the central shaft 24 which meshes with a gear 68 fast on a shaft 70 rotatably supported in and extended between the end plates 60, 62. The gear 68 meshes with an elongated pinion 72 fast on a second shaft 74 rotatably mounted in and extended between the end plates 60, 62, and an extended portion of the pinion 72 also meshes with a gear 76 fast on a third shaft 78 also rotatably mounted in and extended between the end plates 60, 62. The gear 76 meshes with a gear 80 keyed to the sleeve 44 carried by the shaft 24, the gear 80 being of the same diameter as the gear 66 keyed to the shaft 24 so that in operation the train of gears effects rotation of the sleeve 44 in the same direction and at the same speed as the shaft 24.

From the description thus far it will be observed that through the gearing described the arms 38, 42 fast on the shaft 24 and sleeve 44 respectively will be rotated in the same direction and at the same speed when the shaft 24 is rotated, and similarly, the arms 36 and 40 fast on the shaft 32 and sleeve 52 respectively will be rotated at the same speed and in the opposite direction, as indicated by the arrows. As herein shown, provision is made for adjusting the angular relationship between the arms supported on the shafts and the arms supported on the sleeves of each rotary unit. This may be accomplished by bodily rotating the end plates 60, 62 and the train of gears carried thereby relative to the sleeve 44 and shaft 24 respectively on which the end plates are pivotally mounted. As shown in Figs. 4, 5 and 6, a gear segment 82 secured to the end plate 62 and concentric with the shaft 24 is arranged to mesh with a worm gear 84 mounted on a shaft 86 supported in a bracket 88 attached to the frame 15 of the body to which the force is to be applied, the shaft 86 being provided with a handle 90 for effecting manual adjustment of the plates.

With this construction it will be seen that in operation when the worm 84 is rotated, the plates 60, 62 and the gears carried thereby are bodily rotated about the main shaft 24 so that the gear 68 carried by the plates 60, 62 will roll about the gear 66 keyed to the shaft 24, such rolling movement being transmitted through the gear train 64 to effect relative rotation of the gear 80 on the sleeve 44, thereby effecting a variation in the angular disposition of the sleeve carried arms 40, 42 relative to the shaft carried arms 36, 38. It will be observed that in operation the slotted ends of the roller supporting arms merely guide the rollers through an angular path, the rollers having freedom of movement radially in the slots so that no radial or cyclical stresses are transmitted to the shafts and bearings of the structure.

Figure 3:
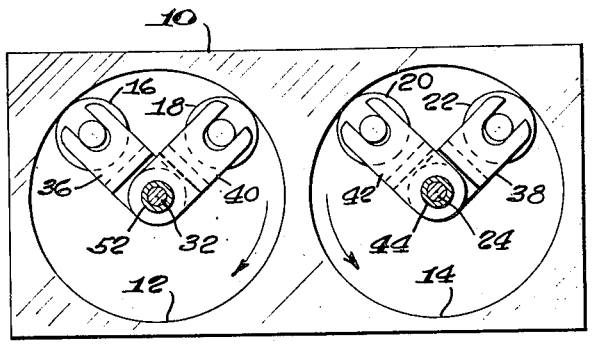
Fig. 3 is a more or less diagrammatic view similar to Fig. 1 showing portions of the force producing apparatus in different positions of operation.
Figure 7:
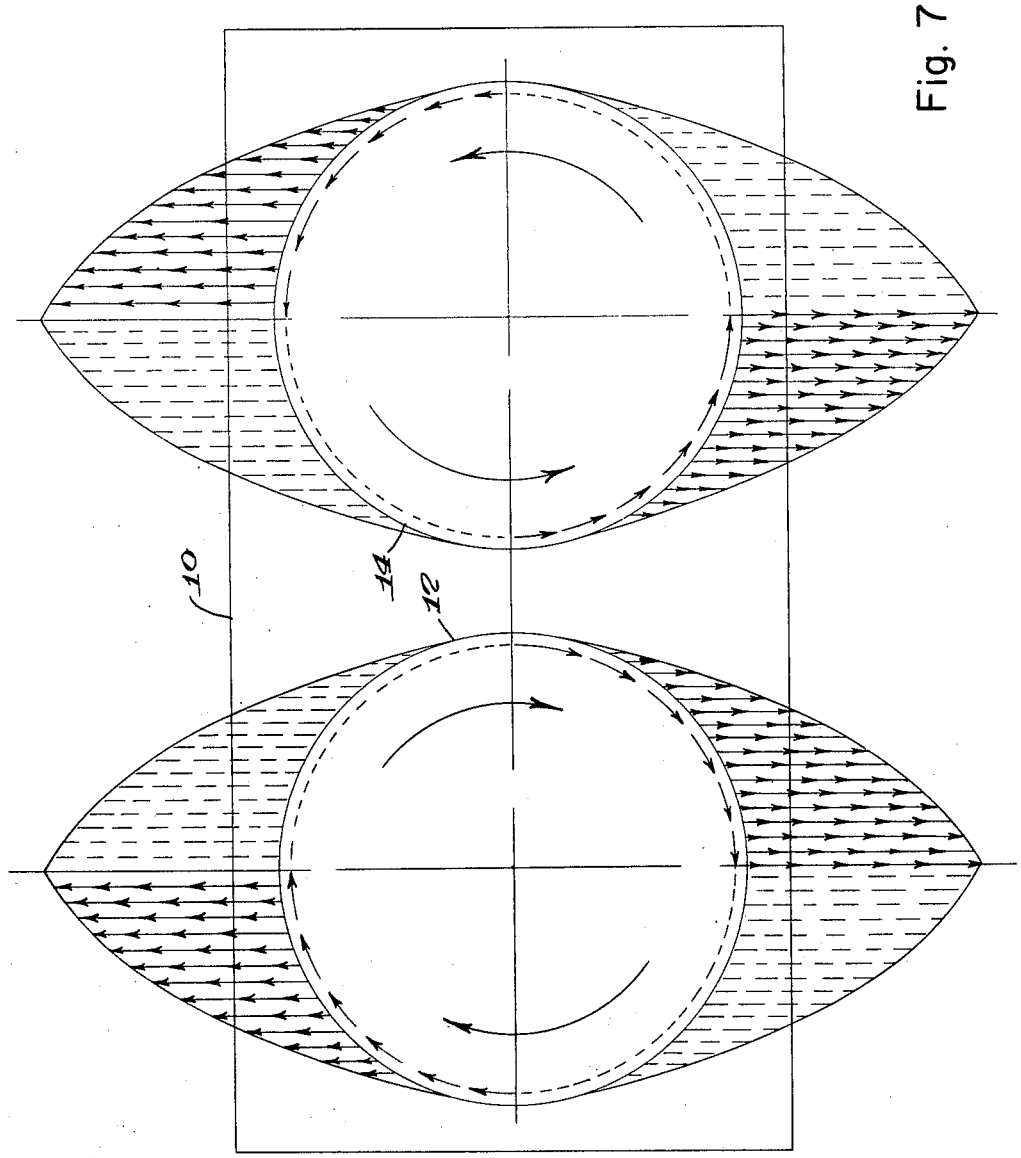
Fig. 7 is a diagrammatic view illustrating schematically the forces generated in one plane in the operation of the present apparatus.

In the operation of the apparatus when the roller supporting arms are adjusted to the positions shown in Fig. 1 wherein the rollers in each bore are disposed at exactly 180° from each other and in corresponding balanced positions, no vibratory force will be generated when the apparatus is in operation and the rollers rotated in opposite directions, as indicated by the arrows, regardless of the speed of rotation, since such balanced disposition of the rollers will effect cancellation of corresponding forces in opposite directions insofar as the force action is experienced by the housing 10. However, by rotating the worm 84 to effect adjustment in the angular disposition of the sleeve driven rollers 18, 20 relative to the shaft driven rollers 16, 22 in equal amounts of imbalance, as indicated in Fig. 3, the forces generated by the rollers in each bore 12, 14 will be added to each other during their downward movement or rotation beyond a horizontal plane, as diagrammatically indicated in Fig. 7, and similarly during their upward movement beyond a horizontal plane whereby to effect vibratory motion in a vertical plane, and that the forces in a perpendicular plane will cancel each other so that no movement will be effected in a horizontal plane. It will thus be seen that the forces may be controlled to operate in one plane only by maintaining the imbalance of the rollers exactly equal and so timed in their opposing rotational effects as to cancel each other in one plane and to add to each other in a perpendicular plane. Such adjustment may be effected by rotation of the worm 84 while the apparatus is in motion, the meshing engagement of the worm with its worm gear segment maintaining the unit locked in its adjusted position.

It will also be observed that in accordance with an important feature of the present invention the operation of adjusting the roller supporting arms to move the rollers from a zero or balanced position shown in Fig. 1 through various positions of imbalance, to a maximum position wherein the arms in each bore will be aligned or parallel serves to progressively increase the effective mass or weight of the rollers operative to produce the generated forces. Thus, since the effective mass or weight is a factor in determining the force produced in a centrifugal apparatus wherein the force is equal to the mass times the velocity squared, it will be seen that adjustment of the arms in each unit to dispose the rollers in progressively increasing positions of imbalance will vary the effective mass or weight so that in practice harmonic forces of enormous magnitude may be produced and varied over a wide range in a simple and practical manner. It will likewise be seen that by varying the speed of the driving motor the velocity of the rollers may be increased or decreased, thus enabling a second force producing factor to be varied to obtain the force desired.

While the preferred embodiment of the invention has been herein illustrated and described, it will be understood that the invention may be embodied in other forms within the scope of the following claims.

Having thus described the invention, what is claimed is:

1. In force producing apparatus of the character described, in combination, a housing provided with two spaced and parallel cylindrical bores, a pair of cylindrical force producing rollers mounted for rolling contact with the walls of each bore, means for driving the rollers at equal speeds, the pair of rollers in one bore being rotated in a direction opposite to the rollers in the second bore, the corresponding rollers in each bore being arranged to assume corresponding angular positions in opposite directions with relation to the axes of their respective bores to produce harmonic vibratory forces in a single plane, and means for varying said angular positions in equal amounts whereby to vary the effective force produced, said last named means including a gear train forming a part of said driving means, and means for bodily rotating said gear train to effect angular adjustment of one roller in each bore relative to the other roller in each bore.

2. In force producing apparatus of the character described, in combination, a housing provided with two spaced and parallel cylindrical bores, a pair of cylindrical force producing rollers mounted for rolling contact with the walls of each bore, means for driving the rollers at equal speeds, the pair of rollers in one bore being rotated in a direction opposite to the rollers in the second bore, the corresponding rollers in each bore being arranged to assume corresponding angular positions in opposite directions with relation to the axes of their respective bores to produce harmonic vibratory forces in a single plane when the rollers are in an imbalanced position with relation to their respective bores, and means for varying said angular positions in equal amounts from a balanced position to progressively increasing positions of imbalance whereby to progressively increase the magnitude of the vibratory forces produced, said last named means including a gear train forming a part of said driving means, said gear train having provision for making rolling contact with a gear operatively connected to one roller of each pair, and for making driving contact with a gear operatively connected to the second roller of each pair when said gear train is bodily rotated, and means for bodily rotating said gear train to effect angular adjustment of one roller in each bore relative to the other roller in each bore.

3. In force producing apparatus of the character described, in combination, a housing provided with two spaced and parallel cylindrical bores, a pair of cylindrical force producing rollers mounted for rolling contact with the walls of each bore, means for driving the rollers at equal speeds with the pair of rollers in one bore rotated in a direction opposite to the pair of rollers in the second bore, said driving means including a shaft and a sleeve mounted for rotary adjustment on its shaft extended within each bore, and gearing connecting the shafts and the sleeves, arms mounted on said shafts and sleeves and slotted at their outer ends for guiding their respective rollers, the corresponding arms in each bore being arranged to assume corresponding angular positions in opposite directions of rotation so that the rollers guided by said arms will produce harmonic vibratory forces in a single plane, and means for rotatably adjusting the sleeves in each bore relative to their shafts for varying the angular positions of the sleeve arms relative to the shaft arms in equal amounts whereby to vary the force produced by said rollers, the forces produced in opposing bores cancelling each other to produce no vibratory movement when the arms in each bore are adjusted 180° apart to balance each other, and adjustment to progressively increasing positions of imbalance less than 180° apart effecting an increase in the magnitude of the vibratory forces produced, said adjusting means comprising a gear train operatively connected between one of said shafts and its sleeve, and means for bodily rotating said gear train to effect rotary adjustment of the sleeves relative to the shafts.

4. Force producing apparatus as defined in claim 3 wherein the gear train is supported between two plates pivotally mounted on the sleeve and shaft respectively, and wherein the means for bodily rotating the train includes a gear segment mounted on one of said plates and a relatively stationary worm meshing with said segment and arranged to be operated to effect said rotary adjustment during the operation of the apparatus.

References Cited in the file of this patent
UNITED STATES PATENTS

| | | |
|---|---|---|
| 2,127,317 | Welch | Aug. 16, 1938 |
| 2,445,175 | Hittson | July 13, 1948 |
| 2,496,291 | High | Feb. 7, 1950 |